United States Patent

[11] 3,596,837

| [72] | Inventors | Harold E. Todd;<br>David P. Clayton, both of Anderson, Ind. |
|---|---|---|
| [21] | Appl. No. | 859,147 |
| [22] | Filed | Sept. 18, 1969 |
| [45] | Patented | Aug. 3, 1971 |
| [73] | Assignee | General Motors Corporation<br>Detroit, Mich. |

[54] AUTOMATIC HEADLAMP-AIMING SYSTEM
6 Claims, 1 Drawing Fig.

[52] U.S. Cl. ..................................................... 240/7.1,
240/61.2
[51] Int. Cl. ..................................................... B60q 1/00
[50] Field of Search ............................................. 240/7.1, 61,
61.2, 61.3, 61.1, 61.5, 61.9, 61.4, 62.4, 62.3,
44.25, 41.62

[56] References Cited
UNITED STATES PATENTS

| 2,632,097 | 3/1953 | Come .......................... | 240/61.9 |
| 2,820,925 | 1/1958 | Schmidt, Jr. .................. | 240/62.4 X |
| 3,177,355 | 4/1965 | Trowbridge ................. | 240/62.4 X |
| 3,307,029 | 2/1967 | Gross .......................... | 240/62.4 X |
| 3,402,288 | 9/1968 | Deibel et al. .................. | 240/61.1 |

Primary Examiner—Louis J. Capozi
Attorneys—J. L. Carpenter and E. J. Biskup

ABSTRACT: An automatic headlamp-aiming system for a motor vehicle wherein a headlamp is hingedly connected to the vehicle for controlled rotation about a horizontal axis as driven by a vacuum motor which is energized upon operator initiation of an aiming cycle. Control means including a single-ended mercury switch electrically connected to a solenoid serves to automatically deenergize the vacuum motor and lock the system against further movement when the headlamp attains a properly vertically aimed position.

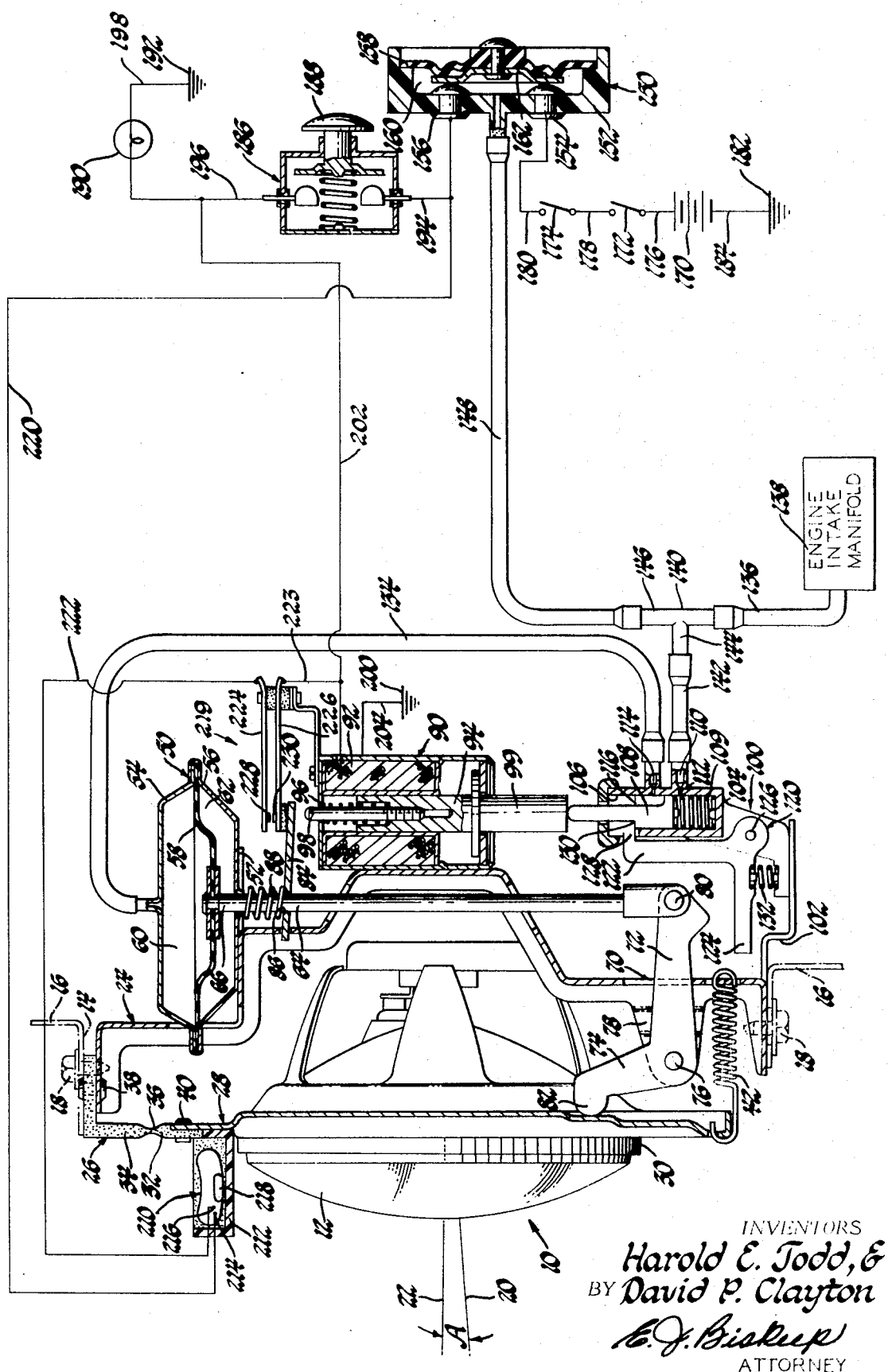

AUTOMATIC HEADLAMP-AIMING SYSTEM

Many motor vehicles such as trucks and tractor-trailer combinations carry varying loads which cause an angular displacement of the longitudinal axis of the vehicle that, in turn, upwardly and downwardly shifts the beams of the headlamps. For example—when a trailer is connected to a tractor, the vehicle will pivot rearwardly causing the headlamp beams to shift upwardly. Oftentimes, this movement shifts the beams above the currently acceptable aiming standards.

To maintain proper headlamp aim under conditions of the aforementioned type, various arrangements have been proposed for regulating the vertical position of the headlamps. Some systems have suggested that the headlamp position be continuously corrected in accordance with body angle changes. However, the constant motion of the headlamps make it virtually impossible to adjust the headlamp position as rapidly as the vehicle body changes position, and, insofar as oncoming drivers are concerned, this type of operation may be less preferable than an uncorrected system. Other arrangements have proposed vertically reaiming the headlamps when the misalignment has exceeded a predetermined amount. However, these systems are not altogether satisfactory inasmuch as the aiming system is only operational when misalignment has exceeded a predetermined amount. Until these systems are excessively out of alignment, correction of the headlamp aim is not possible.

The headlamp-aiming system, made in accordance with the present invention, provides an arrangement wherein an aiming cycle is initiated by the vehicle operator and the headlamp is automatically and repetitively pivoted to an extreme rotated position and thereafter reversely pivoted until a precise vertical position is attained. More specifically, the headlamp is hingedly connected to the motor vehicle for rotation about a transverse horizontal axis. Upon actuation of an aiming switch located interior of the vehicle, a solenoid is energized to automatically unlock the system and cause the headlamp to pivot downwardly to the extreme rotated position. At this time, a valve is actuated which applies vacuum to a vacuum motor which is operatively connected to the headlamp. The vacuum motor serves to reversely pivot the headlamp toward a properly vertically aligned position. A single-ended mercury switch electrically connected to the solenoid is position-referenced to a predetermined plane on the headlamp so as to be electrically open when the headlamp is accurately vertically positioned. The opening of the mercury switch when the aforementioned position is attained deenergizes the solenoid and interrupts the vacuum supply to the motor to thereby simultaneously lock against the system further rotation. The system additionally incorporates interlock means for preventing inadvertent initiation of an aiming cycle.

Accordingly, it is an object of the present invention to provide a headlamp-aiming system which is operable to automatically vertically aim the position of the headlights.

Another object of the present invention is to provide a headlamp aiming system wherein the position of the headlamps is regulated by a vacuum motor which is controlled by a solenoid electrically connected to a single-ended mercury switch that is accurately referenced to a desired vertical position of the headlamp.

Yet another object of this present invention is to provide a headlamp-aiming system which is continuously operable by the driver to initially downwardly pivot the headlamp to an extreme rotated position and thereafter reversely pivot the headlamp until a properly aimed position is reached at which time the system is automatically deenergized and conditioned against further movement.

A further object of the present invention is to provide a system for automatically vertically aiming the headlamps of a motor vehicle wherein the headlamps are hingedly connected to the vehicle for rotation about a horizontal axis as driven by a vacuum motor, the system upon operator actuation being unlocked and pivoted to an extreme rotated position and thereafter reversely pivoted by the vacuum motor until the latter is deenergized and the system conditioned against further movement by control and locking means including a single-ended mercury switch that is referenced to an accurately vertically aligned position of the headlamp.

These and other objects will be apparent to one skilled in the art upon reading the following detailed description, reference being made to the accompanying drawing in which a schematic view of an automatic headlamp-aiming system for a motor vehicle made in accordance with the present invention is shown.

Referring to the drawing, there is shown a headlamp 10 for a motor vehicle including a sealed-beam headlamp unit 12 which is secured within a frontal opening 14 of a motor vehicle panel 16 by means of bolts 18. As is conventional, a pair of headlamps are symmetrically disposed on opposite sides of the vehicle, each of which may include one or more headlamp units 12 depending on the type of lighting system being employed. The aiming system hereinafter described is adapted for use in all such systems along with the aiming and control means for automatically establishing the correct vertical headlamp aim.

The headlamp 10 hereinafter described will be designated "in line" or "properly aimed" in a vertical aiming plane when the actual optical axis 20 of the headlamp unit 12 bears a known angle "A" or is within acceptable limits of a horizontal plane 22. The headlamp 10 will be designated "out of line" or "improperly aimed" in a vertical aiming plane when the actual optical axis 20 of the headlamp unit 12 is outside the acceptable tolerances for angle "A." By way of example, a conventional 7-inch type 2-headlamp unit which includes upper and lower beam filaments is considered to be "in line" when the actual optical axis 20 geometric center of the high intensity zone of the lower headlamp beam is at the horizontal plane 22, 0° angle "A," with a permissible tolerance of ±2 inches at 25 feet.

Each headlamp 10 generally comprises a sheet metal housing 24, a plastic hinge 26, and a mounting plate 28 to which the headlamp unit 12 is fixedly secured by means of an annular retaining ring 30. The hinge 26 includes a lower section 32 and an L-shaped upper section 34 which are mutually joined at a web 36 of reduced cross section that defines a transverse horizontal hinge axis about which the headlamp unit 12 can be selectively rotated by the aiming and control means to be described below. The upper section 34 is fixedly connected to the housing 24 by rivets 38 and the lower section 32 is fixedly connected to the mounting plate 28 by rivets 40. A coiled spring 42 tensioned between the lower ends of the mounting plate 28 and the housing 24 serves to bias the headlamp unit 12 and the mounting plate 28 counterclockwise about the web 36.

The means for selectively positioning the headlamp unit 12 about the web 36 include a vacuum motor 50 which is fixedly mounted to a plate 52 at the rear of the housing 24. The vacuum motor 50 includes an upper section 54 and a lower section 56 between which a flexible diaphragm 58 is sealingly secured. The diaphragm 58 separates the interior of the vacuum motor 50 into a vacuum chamber 60 and an atmospheric chamber 62.

A vertically disposed shaft 64 has an upper end 66 which projects upwardly through a central opening in the lower section 56 and is fixedly connected to the diaphragm 58.

A generally L-shaped lever 70 including a horizontal leg 72 and a vertical leg 74 is centrally pivotally connected by a pin connection 76 to a forwardly projecting bracket 78 formed on the housing 24. The leg 72 is pivotally connected to the lower end of the shaft 64 by a pin connection 80. The leg 74 terminates at a rounded tip 82 which bears against the rear surface of the mounting plate 28.

The means for locking the headlamp 10 against rotation generally comprises a lock bar 84 that is pivotally connected at a forward end to the housing 24. The lock bar 84 has a central opening 86 through which the shaft 64 extends. A compression spring 88 interposed between the plate 52 and the lock bar 84 serves to downwardly pivot the latter such that the peripheral edge of the opening 86 frictionally engages the shaft 64 thereby axially locking the latter and the lever 70 which, in turn, conditions the headlamp 10 against rotation about the web 36.

The means for unlocking the headlamp 10 and energizing the vacuum motor 50 includes a solenoid 90 that is fixedly mounted on a rear surface of the housing 24. The solenoid 90 is conventional in construction and includes a coil 92 which, when energized, serves to upwardly attract a core 94 against the influence of a return spring 96. A shaft 98 attached to the upper end of the core 94 is adapted to engage and upwardly pivot the outer end of the lock bar 84 for unlocking the aiming system. A plunger 99 projects downwardly from the lower end of the core 94 toward a vacuum valve 100.

The vacuum valve 100 is fixedly mounted to a bracket 102 on the housing 24 and includes a valve body 104 having a bore 106 in which a valve member 108 is slidably disposed. A compression spring 109 disposed in the bore 106 upwardly biases the valve member 108. An inlet port 110 including an orifice 112 and an outlet port 114 fluidly communicate with the bore 106. The valve member 108 includes a slot 116 for venting the outlet port 114 to atmosphere.

An L-shaped locking handle 120 having an upper arm 122 and a lower arm 124 is pivotally connected to the valve body 104 by a pin connection 126. The upper arm 122 includes a rearwardly projecting finger 128 which engages a shoulder 130 on the valve member 108 to lock the latter against upward movement under the influence of the spring 109. The locking handle 120 is biased in a clockwise direction about the pin connection 126 by means of a compression spring 132 interposed between the valve body 104 and the lower arm 124.

When the valve 100 is unlocked and the valve member 108 shifts upwardly, the inlet port 110 and the outlet port 114 are fluidly connected. A conduit 134 fluidly connects the outlet port 114 to the vacuum chamber 60 for supplying vacuum to the vacuum motor 50. An inlet conduit 136 has a lower end connected to a vacuum source 138 such as the engine intake manifold and has an upper end connected to a T-connection 140. A branch conduit 142 is fluidly connected between the inlet port 110 and a branch 144 of the T-connection 140. The other branch 146 of the T-connection 140 is fluidly connected by a conduit 148 to a vacuum interlock switch 150.

The interlock switch 150 includes a housing 152 having spaced electrical contacts 154 and 156. A flexible diaphragm 158 is disposed across the housing 152 and defines therewith a chamber 160. When a vacuum is applied to the chamber 160 through the conduit 148, the diaphragm 158 is drawn leftwardly and a conductive bridge 162 electrically connects the contacts 154 and 156 to close the interlock switch 150.

The electrical control system for the headlamp-aiming system generally includes a power source 170, such as the vehicle battery, that is electrically connected in series with an ignition switch 172, a parking brake switch 174, and with the contact 154 by conductors 176, 178, and 180. The power source 170 is connected to a ground 182 by a conductor 184. A normally open aiming switch 186 including an aiming button 188 and a pilot light 190, both of which are located interior of the vehicle, are electrically connected in series between the contact 156 and a ground 192 by conductors 194, 196, and 198. The coil 92 of the solenoid 90 is electrically connected in series between the aiming switch 186 and a ground 200 by conductors 202 and 204.

A conventional single-ended mercury switch 210 is mounted in a forwardly projecting bracket 212 formed in the lower section 32 of the hinge 26. The mercury switch 210 includes a pair of contacts 214 and 216 and a drop of mercury 218. The mercury switch 210 is suitably referenced to the headlamp unit 12 such that the mercury 218 breaks contact with the contacts 214 and 216 and opens the circuit when the actual optical axis 20 is accurately positioned at angle "A" with respect to the horizontal plane 22. The contacts 214 and 216 of the mercury switch 210 are electrically connected in parallel with the aiming switch 186 and in series with the solenoid 90 and a contact assembly 219 by conductors 220, 222, and 223.

The contact assembly 219 includes a pair of flexible arms 224 and 226. One end of each arm 224 and 226 is respectively electrically connected to the conductors 222 and 223. The other end includes a pair of normally spaced contacts 228 and 230, which are closed when the aiming system is unlocked. The contact assembly 219, as will hereinafter be described, serves to prevent inadvertent cycling of the aiming system in the event the vehicle is parked on a grade such that the contacts 214 and 216 would be closed.

OPERATION OF THE AIMING SYSTEM

The aiming system, as described above, is designed to be operable when the motor vehicle is at rest on a level with the engine running such that the ignition switch 172 and the parking brake switch 174 are closed and the interlock switch 150 is actuated to close the contacts 154 and 156. These features insure that the vehicle is motionless and on an accurate aiming platform with sufficient manifold vacuum to operate the motor 50. The automatic aiming cycle is initiated by momentarily depressing the aiming switch 186 so as to complete the circuit to the solenoid 90. With the solenoid thus energized, the core 94 shifts upwardly and the shaft 98 engages the outer end of the lock bar 84 thereby upwardly pivoting the latter and unlocking the shaft 64. Simultaneously, the light 190 is illuminated to visually indicate commencement of the aiming cycle. The energization of the solenoid 90 thus unlocks the system and permits the shaft 64 to shift downwardly. This movement, in turn, causes the lever 70 to rotate clockwise thereby permitting the headlamp unit 12 and the mounting plate 28 to pivot counterclockwise about the web 36 to an extreme rotated position under the influence of the spring 42. During this pivotal movement, the mercury 218 bridges the contacts 214 and 216 to complete the parallel circuit to the solenoid 90 through the conductors 222 and 223 and the contact assembly 219, thereby permitting the release of switch 186 without an interruption of the aiming cycle. The closing of the mercury switch 210 also maintains the circuit for the light 190.

The clockwise movement of the lever 70 causes the horizontal leg 72 to engage the outwardly extending lower arm 124 of the locking handle 120 thereby pivoting the latter in a counterclockwise direction about the pin connection 126 against the influence of the spring 132. This, in turn, will unlock the valve member 108 such that the latter shifts upwardly under the influence of the spring 109 and the outlet port 114 is fluidly connected with the vacuum source 138 through the inlet port 110. Because of the orifice 112, vacuum is gradually metered to the vacuum chamber 60 through the conduit 134. As the vacuum in the chamber 60 is increased, the pressure differential applied to the diaphragm 58 causes the latter and the shaft 64 to slowly move upwardly. As shaft 64 moves upwardly, the lever 70 is rotated counterclockwise, thereby causing the headlamp unit 12 and the mounting plate 28 to pivot clockwise about the web 36. When the lighting unit reaches the correctly aimed position wherein the optical axis 20 bears the predetermined angle "A" with the plane 22, the mercury 218 will break contact with the contacts 214 and 216, thereby interrupting the circuit to the solenoid 90 whereupon the core 94 shifts downwardly under the influence of spring 96 and the lock bar 84 frictionally engages the shaft 64 to condition the system against further rotation. The breaking of the circuit through the mercury switch 210 also breaks the circuit to the pilot light 190 to extinguish the latter and indicate completion of the aiming cycle.

As the core 94 shifts downwardly, the plunger 99 engages the upper end of the valve member 108 thereby shifting the latter downwardly against the influence of the spring 109 until locked by the handle 120. This interrupts the supply of vacuum to the motor 50 from the source and vents the vacuum chamber 60 to atmosphere through the conduit 134 and the slot 116.

Thus, it will be noted that an identical sequence of operations is followed regardless of the relative position of the optical axis 20 with respect to the horizontal plane 22. For all orientations, the headlamp unit is first pivoted downwardly to an extreme and improperly aimed position whereupon the motor means are energized to reversely pivot the latter to a correctly aimed position at which time the circuit through the mercury switch is interrupted and the system is automatically deenergized and locked against further rotation. By following this manner of aiming, the mercury switch can be accurately calibrated with reference to the desired position of the headlamp unit 12. The unidirectional movement of the latter will insure that the system is repetitively and automatically deenergized at the "in line" position thereby eliminating the tolerance zone associated with systems incorporating bidirectional aiming and double-ended mercury switches.

Although only one form of this invention has been shown and described, other forms will be readily apparent to those skilled in the art. Therefore, it is not intended to limit the scope of this invention by the embodiment selected for the purpose of this disclosure but only by the claims which follow.

What we claim is:

1. A system for automatically vertically aiming the headlamps of a motor vehicle comprising: a lighting unit which is in a correctly vertically aimed position when oriented in a known plane relative to the motor vehicle; hinge means connecting the lighting unit to the vehicle for controlled pivotal movement about a transverse horizontal axis; means for pivoting said lighting unit about said axis to improperly aimed position; a power source; electromagnetic motor means connected to said power source; switch means connected between said power source and said electromagnetic motor means operable to selectively actuate the latter; a single-ended mercury switch connected to the electromagnetic motor means in parallel with the switch means and referenced to said known plane, said mercury switch being operable to maintain energization of electromagnetic motor means until the lighting unit is positioned in said known plane; vacuum motor means operatively associated with the lighting unit for unidirectionally pivoting the latter about said axis from said improperly aimed position; locking means for conditioning the system against movement operatively connected between the lighting unit and the electromagnetic motor means, said locking means being operable to unlock the system upon actuation of the switch means and automatically lock the system when the lighting unit is in said known plane; and control means between said electromagnetic motor means and the lighting unit for energizing said vacuum motor means at said improperly aimed position and automatically deenergizing the vacuum motor means when the lighting unit is positioned in said known plane.

2. An automatic vertical headlamp-aiming system for a motor vehicle comprising: a lighting unit which is correctly vertically aimed when oriented in a known plane relative to the motor vehicle; hinge means connecting said lighting unit to the vehicle for controlled pivotal movement about a transverse horizontal axis; spring means for pivoting said lighting unit about said axis to an extreme rotated position; a power source; solenoid means connected to said power source; switch means connected in series between said power source and said solenoid means for selectively actuating the latter; a single-ended mercury switch connected in parallel with said switch means and in series with said solenoid means, said mercury switch being referenced to said known plane and thereby operable to maintain energization of said solenoid means independently of said switch means until said lighting unit is positioned in said known plane; a vacuum source; a unidirectionally energized vacuum motor fluidly connected to said vacuum source and adapted upon energization to pivot said lighting unit about said axis from said extreme rotated position; locking means connected between said lighting unit and said solenoid means for unlocking the system upon actuation of said switch means and for automatically locking the system against movement when said lighting unit is in said known plane; control means connected between said solenoid means and said lighting unit for energizing said vacuum motor at said extreme rotated position and automatically deenergizing said vacuum motor when said lighting unit is positioned in said known plane.

3. The invention recited in claim 2 wherein interlock means are operatively connected between said vacuum source and said solenoid means for preventing actuation of the system until predetermined conditions are established.

4. The invention recited in claim 2 wherein said control means includes a valve which is opened at said extreme rotated position to energize said vacuum motor by fluidly connecting the latter to said vacuum source and is closed when said lighting unit is in said known plane to thereby deenergize said vacuum motor.

5. An automatic vertical headlamp-aiming system for a motor vehicle comprising: a lighting unit which is correctly vertically aimed when oriented in a known plane relative to the motor vehicle; a plastic hinge having first and second sections respectively connected to said lighting unit and said motor vehicle; an integral transverse horizontal web of reduced cross section pivotally connecting said sections; a spring connected between said lighting unit and the motor vehicle which biases the former about said web to an extreme downwardly rotated position; a battery; a solenoid connected to the battery; an aiming switch connected in series between said battery and said solenoid that is operable to selectively actuate the latter; a single-ended mercury switch connected in parallel with said aiming switch and in series with said solenoid, said mercury switch being referenced to said known plane and operable to maintain energization of said solenoid independently of said aiming switch until said lighting unit is positioned in said known plane; a vacuum source; a unidirectionally energized vacuum motor fluidly connected to said vacuum source; a shaft connected to the vacuum motor; a lever.

6. An automatic aiming system for properly aiming a headlamp of a motor vehicle which is stationary on a level surface, said aiming system comprising: hinge means for supporting said headlamp on said vehicle for movement about a horizontal axis extending transversely of the vehicle; means connected between the headlamp and the vehicle for pivoting said headlamp about said horizontal axis in one direction to an extreme rotated position wherein the headlamp is improperly aimed each time said system is energized; and motor means unidirectionally effective after said headlamp reaches said extreme rotated position for moving the headlamp in the opposite direction about said horizontal axis; and control means including leveling means carried by the headlamp and referenced to the optical axis of the headlamp for automatically stopping movement of the headlamp in said opposite direction when the headlamp attains a predetermined aimed position relative to said level surface.